Sept. 2, 1969        M. SEIDERMAN        3,464,389
APPARATUS FOR RECEIVING AND REMOVING DROPPINGS
FROM CAGED ANIMALS
Filed Jan. 16, 1967        3 Sheets-Sheet 1
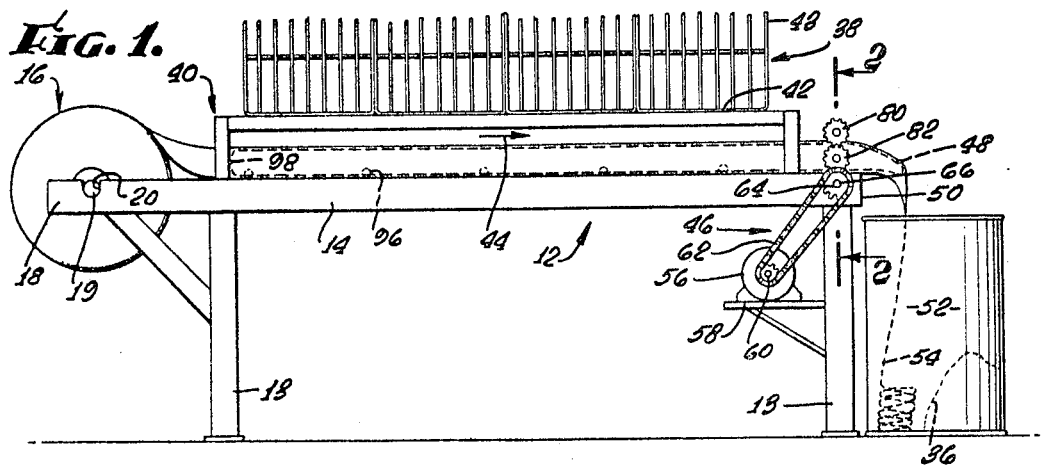
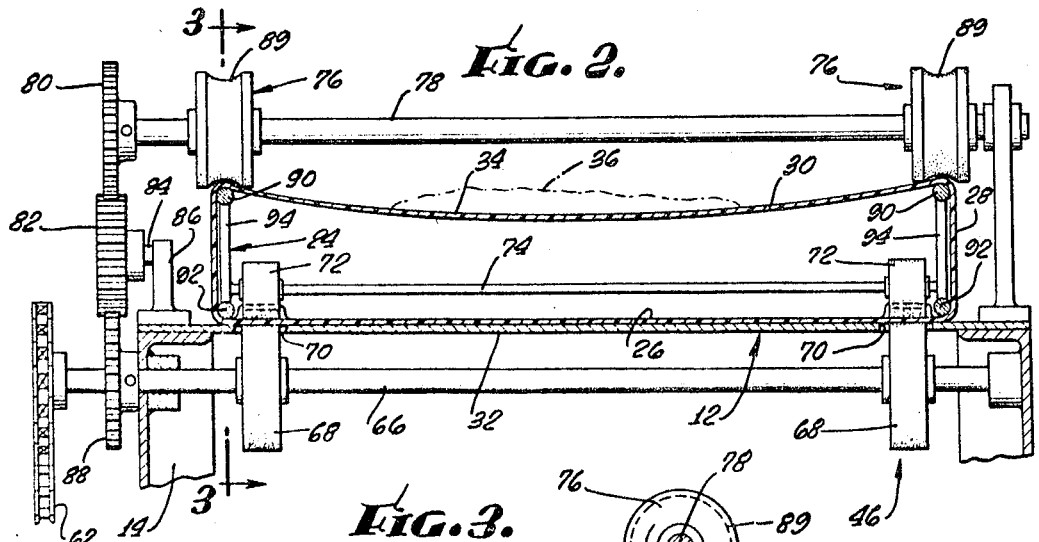
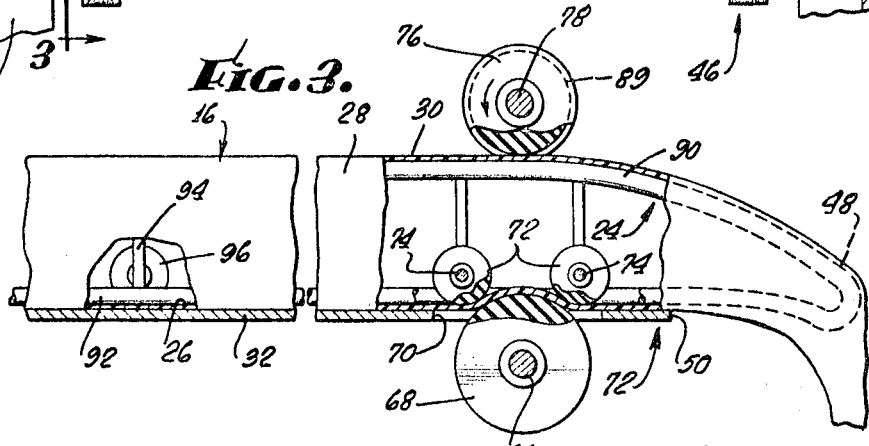
INVENTOR.
MAURICE SEIDERMAN
BY
*Lyon & Lyon*
ATTORNEYS.

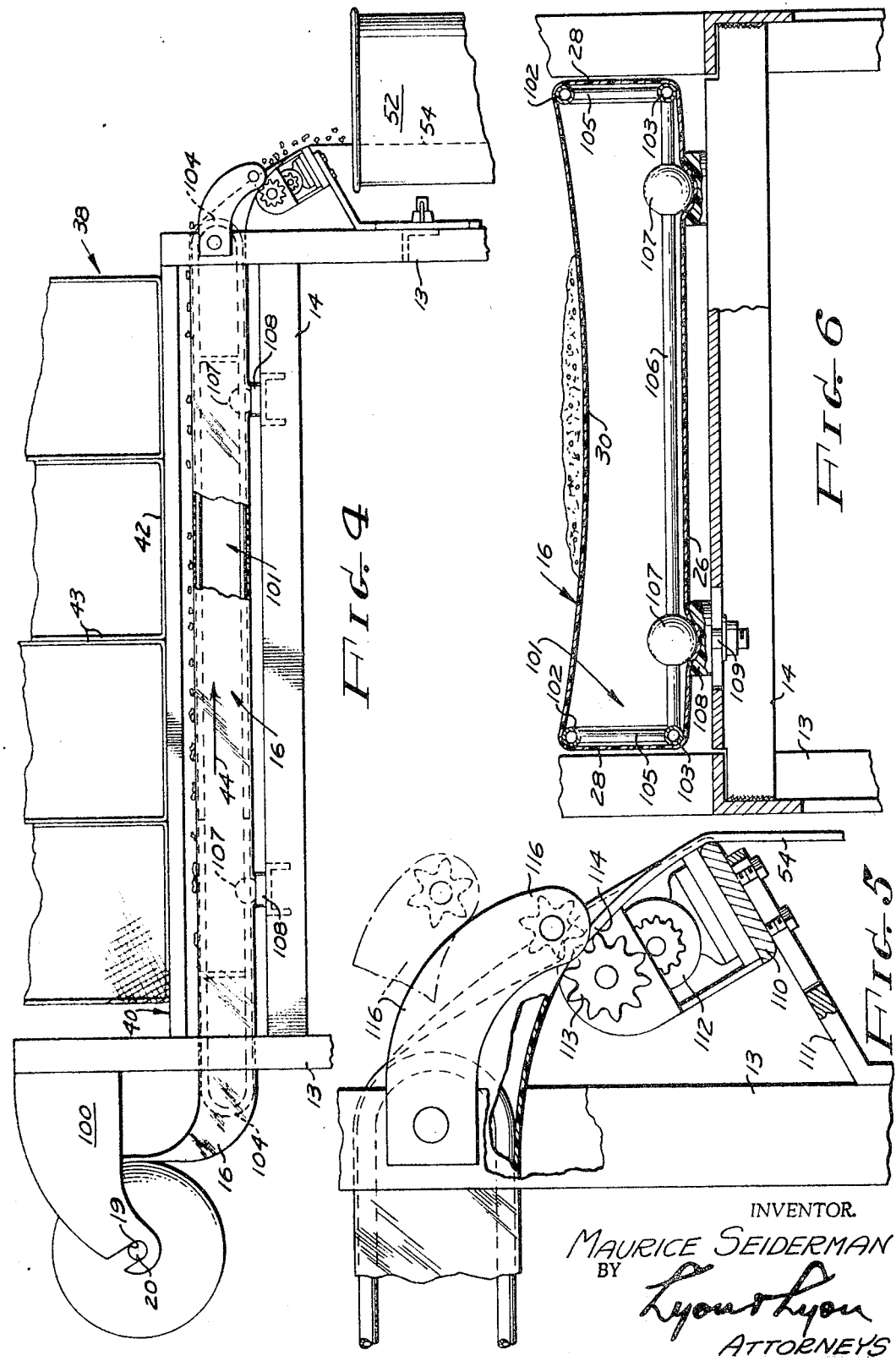

Sept. 2, 1969  M. SEIDERMAN  3,464,389
APPARATUS FOR RECEIVING AND REMOVING DROPPINGS
FROM CAGED ANIMALS
Filed Jan. 16, 1967  3 Sheets-Sheet 3
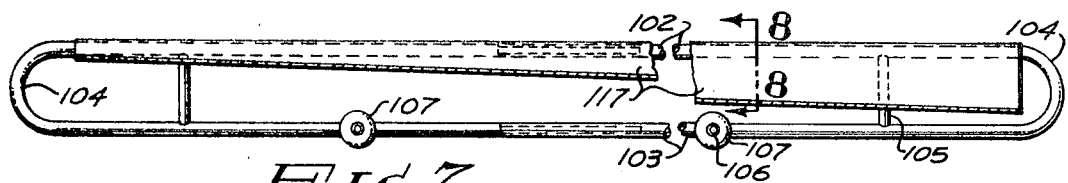
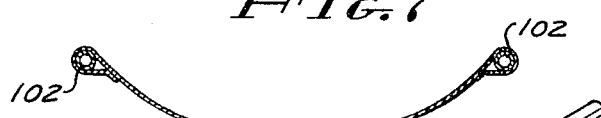
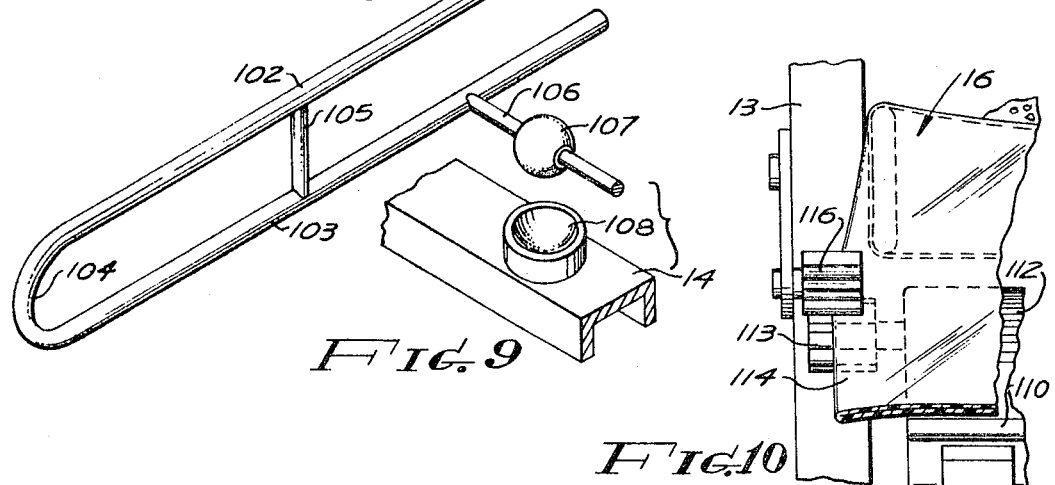
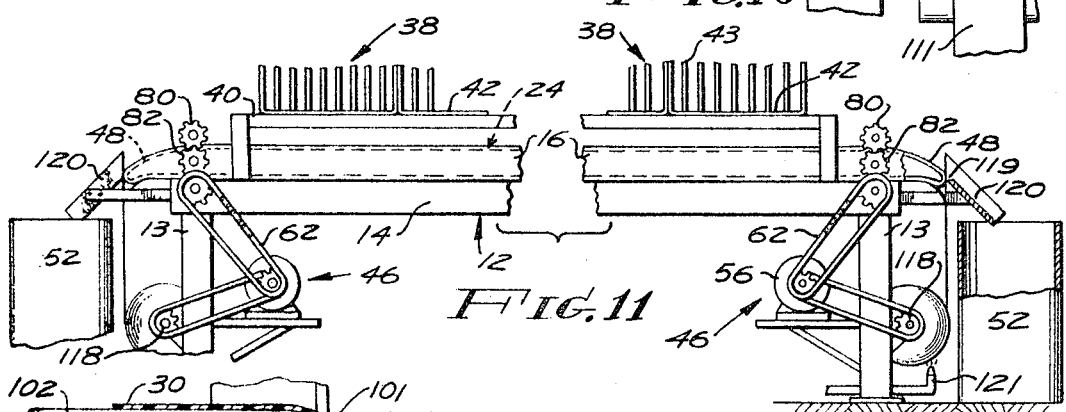
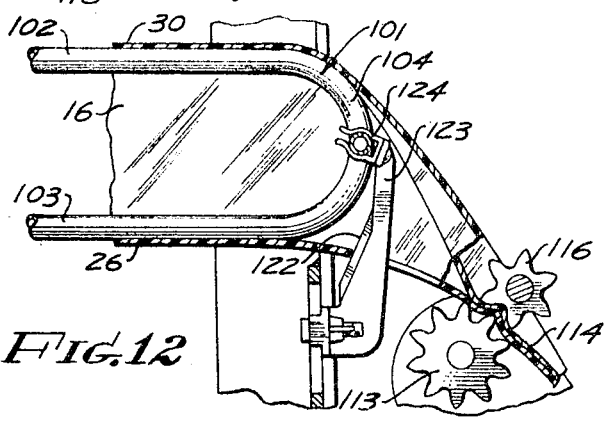
INVENTOR.
MAURICE SEIDERMAN
BY
Lyon & Lyon
ATTORNEYS United States Patent Office 3,464,389
Patented Sept. 2, 1969

3,464,389
APPARATUS FOR RECEIVING AND REMOVING DROPPINGS FROM CAGED ANIMALS
Maurice Seiderman, Hollywood, Calif., assignor to William Stone, Jr., Sherman Oaks, Calif.
Continuation-in-part of application Ser. No. 503,493, Oct. 23, 1965. This application Jan. 16, 1967, Ser. No. 609,459
Int. Cl. A01k 31/04
U.S. Cl. 119—22        13 Claims

ABSTRACT OF THE DISCLOSURE

An apparatus utilizing a disposable traveling membrane of plastic material disposed under a row of cages and fed from a roll onto a fixed supporting structure; the membrane completely covering the top and sides of the supporting structure, and the supporting structure causing the membrane to assume an essentially catenary profile.

BACKGROUND OF INVENTION

This invention relates to new and useful apparatus for receiving and disposing droppings from caged animals contained in a row of cages, and is a continuation-in-part of patent application Ser. No. 503,493, filed Oct. 23, 1965, for Self Cleaning Cages, now abandoned.

There are many instances in the prior art where animals are housed in cages having wire-mesh bottom walls through which animals' refuse drops onto trays or endless conveyor belts.

Although generally satisfactory, this type of prior art animal cage does have certain disadvantages.

A major disadvantage resides in the fact that the trays or endless belts which catch the animal refuse must be periodically cleaned and, in some cases, sterilized.

Another disadavntage resides in the fact that the refuse accumulates on the trays or endless belts until they are cleaned and therefore sometimes constitutes a health hazard to the animals housed in the cages.

Yet another disadvantage resides in the fact that unpleasant odors emanate from the refuse collecting on the trays or endless belts.

In view of the foregoing factors and conditions characteristic of animal cages having trays or endless belts on which animal refuse collects, it is a primary object of the present invention to provide a new and useful apparatus not subject to the disadvantages enumerated above and having self-cleaning means especially designed for automatically disposing of refuse efficiently, safely and expeditiously.

Another object of the present invention is to provide a new and useful disposable belt for automatically disposing of refuse.

Still another object of the present invention is to provide in combination with a plurality of cages having wire-mesh bottoms, disposable means which travel beneath the wire-mesh bottoms continuously to a point of discharge so that refuse may be collected and disposed of.

According to a preferred form of this present invention, a supply roll of a disposable, collapsed, tubular membrane is rotatably mounted at one end of a frame having parallel, spaced-apart rails above which a plurality of cages may be provided. The tubular membrane forms a sleeve which encases a supporting structure that remains fixed while the membrane is drawn continuously beneath the cages to collect the animal droppings, then continues beyond the cages and supporting structure, and discharges with the droppings into a refuse collector which may be positioned either adjacent the cages or outside the building in which the cages are housed. As the membrane received in the collector may be severed from the preceding length of the membrane so that the collector and its contents may be removed from time-to-time without stopping the movement of the membrane.

The supporting structure causes the upper wall of the encompassing membrane to droop in an essentially catenary shape forming a trough for the collection of refuse from animals housed in the cages.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

DESCRIPTION OF DRAWINGS

FIGURE 1 is an elevational view of a plurality of aligned animal cages in combination with a traveling, disposable membrane and supporting structure of the present invention.

FIGURE 2 is a partial, enlarged cross-sectional view taken along line 2—2 of FIGURE 1.

FIGURE 3 is an enlarged, partial cross-sectional view taken along line 3—3 of FIGURE 2.

FIGURE 4 is a fragmentary side view similar to FIGURE 1 showing a modified form of the supporting structure.

FIGURE 5 is an enlarged fragmentary side view, partly in section, showing the discharge end of the supporting structure and the drive means for the membrane, the view being taken within circle 5 of FIGURE 4.

FIGURE 6 is an enlarged, transverse sectional view taken through 6—6 of FIGURE 4.

FIGURE 7 is a side view of a further modified membrane supporting structure.

FIGURE 8 is a transverse sectional view thereof taken through 8—8 of FIGURE 7.

FIGURE 9 is a fragmentary perspective view showing the supporting structure and one means for restraining the supporting structure against axial movement.

FIGURE 10 is an enlarged fragmentary end view taken from 10—10 of FIGURE 4, the membrane being indicated in section.

FIGURE 11 is a fragmentary side view similar to FIGURES 1 and 4, showing a further modified construction in which the membrane is driven first in one direction then in the opposite direction.

FIGURE 12 is an enlarged fragmentary sectional view corresponding to FIGURE 5, but showing a modified means for restraining the supporting structure.

Reference is first made to FIGURES 1, 2 and 3. This embodiment of the invention includes a table or bench-like member 12 having legs 13 which support a platform member 14. A roll of disposable, traveling membrane 16 is rotatably mounted at one end 18 of the platform 14 by a shaft 19 journaled in U-shaped notches 20 provided in the end 18.

The traveling membrane 16 is preferably made from an inexpensive plastic material such as vinyl, polyethylene or other thin film in the form of a flat tube and wound into a roll. The membrane, when opened, forms a sleeve to encompass a membrane-shaping frame or supporting structure 24 in such a manner that a bottom wall 26, side walls 28 and top wall 30 are formed in the membrane 16. The bottom wall 26 is supported by the top wall 32 of the platform 14 and the top wall 30 sags somewhat as shown in FIGURE 2, forming a trough 34 for the reception of refuse 36 which may be deposited thereon from a plurality of animal cages 38 supported above the top wall 30 by a frame 40.

The refuse 36 may constitute droppings which may pass through wire-mesh bottom walls 42 from animals (not shown) housed between wire-mesh walls 43 in the cages 38. The membrane 16 may be caused to travel continuously in the direction of arrow 44 by a membrane-driving mechanism 46 while the frame 24 remains stationary. The frame 24 includes an end portion 48 which extends beyond the end 50 of platform 14 over a suitable container 52 to receive the refuse 36 and the discharge end 54 of the traveling membrane 16 as it collapses after being directed thereinto by the downwardly curved shape of the end 48 of frame 24.

The membrane driving mechanism 46 includes a prime mover 56 which is supported on a platform 58 attached to one of the legs 13. The prime mover 56 may comprise an electric motor and includes a driven gear 60 about which a drive-chain 62 is trained. The chain 62 is also trained about a driven gear 64 which is keyed to a shaft 66 which, in turn, is rotatably mounted in the platform 14 subjacent the top wall 32 thereof. High-coefficient of friction rollers 68 are also keyed to the shaft 66 near each end thereof and are of sufficient diameter to extend up through apertures or openings 70 provided in the top wall 32 where they contact the bottom wall 26 of the traveling membrane 16. The rollers 68 deform the bottom wall 26 upwardly between a pair of caging rollers 72 rotatably mounted on each end of a pair of parallel shafts 74 affixed to the frame 24 and extending transversely across the bottom wall 26 of the membrane 16. Thus, the rollers 68 will advance the bottom wall 26 in the direction of arrow 44 while the rollers 72 cage the frame 24 so that it will remain stationary.

It should be noted that in this embodiment of the invention the membrane-shaping frame 24 is not physically connected to any other part of the apparatus. Hence, when the traveling membrane 16 touches the frame or supporting structure 24 as it is moved past, there is a tendency for the frame 24 to move in the same direction as the traveling membrane 16 is moved. Such movement of the membrane-shaping member 24 is prevented by the caging effect produced by rollers 72 on the bottom of the frame member 24 pressing against rollers 68 which project above the top wall 32 of the platform 14.

In order to effectively create this caging of the membrane-shaping frame 24, at least a portion of the rollers 68 need to project above the top of the table 32 and press against at least one roller such as 72 on the bottom of frame 24. This roller 72 is positioned on the side of a roller 68 that is farthest from the disposal point of membrane 16 which passes over frame 24 thereby holding the frame stationary when the traveling membrane 16 moves past it. Of course, when rollers 72 are positioned on both sides of rollers 68 the frame 24 is prevented from being moved whichever direction the traveling membrane 16 is moved relative to the frame 24. The top wall 30 is driven in the direction of arrow 44 by a pair of rollers 76 which are keyed to a shaft 78 for rotation therewith.

A gear 80 is also keyed to the shaft 78 and engages an idler gear 82 rotatably mounted on a stub shaft 84 which is supported on the platform 14 by a bracket 86. The idler gear 82 engages a gear 88 which is keyed to the shaft 66 for rotation thereby to impart reverse rotation to the gear 80. The high-coefficient-of-friction rollers 76 include grooved portions 89 which increase the frictional engagement with the top wall 30 by causing it to partially encompass an upper tubular member 90 provided on each side of the frame 24.

The upper tubular members 90 are connected to lower tubular members 92 of frame 24 by vertical brackets 94. The brackets 94 are spaced at uniform intervals along the frame 24 so that an idler roller 96 may be rotatably mounted on each bracket 94. The idler rollers 96 permit the membrane 16 to travel along the platform 14 while the frame 24 remains stationary thereon. If desired, the tubular members 90 and 92 may be provided with low-coefficient friction material to minimize the drag imparted to the membrane 16 by the frame 24.

The upper tubular members 90 and the lower tubular members 92 may comprise a one piece construction bent as shown in broken lines in FIGURE 3 to form the portion 48 and may be connected together as shown in broken lines at 98 in FIGURE 1 to facilitate threading the membrane 16 thereover in encompassing relationship with the frame 24.

The device hereinbefore described is especially useful in laboratories where experimental animals are housed since it facilitates maintaining a sanitary condition in the laboratory. This may be accomplished by continuously moving the belt 16 beneath the cages 38 to catch the droppings from the animals and disposing of them in the container 52 which may be placed outside the laboratory, if desired. When the prime mover 56 is energized, the chain 62 will drive the roller 68 in a clockwise direction, as viewed in the FIGURE 3, while the roller 76 is being driven in a counterclockwise direction. This causes the membrane 16 to advance in the direction of the arrow 44 toward the container 52 while the frame 24 remains stationary upon the table or platform 14 by the coaction of the idler roller 72, the roller 68 and the roller 76.

Reference is now directed to the construction shown in FIGURES 4, 5, 6, 9 and 10. This construction involves essentially a modified means of supporting the membrane-shaping frame or supporting structure, designated 24 in the first described construction. The remaining parts are the same as in the first described construction, except that the membrane roll is shown as supported from brackets 100, supported by upward extensions of a pair of legs 13.

The modified membrane supporting structure 101 is similar to the frame 24 in that it includes upper and lower parallel side bars 102 and 103, joined by looped ends 104. At intervals, the upper and lower bars are connected by vertical braces 105. The side frames formed by the bars 102 and 103 are held in parallel relation by a series of transverse rods 106, some or all of which may serve as axles, each of which receives a pair of wheels 107. The wheels are preferably spherical in contour and project below the lower surface of the supporting structure 101.

Mounted on the platform 14 are pairs of cups 108, having spherical recesses which mate with the contour of the wheels 107. The cups 108 may be secured to the platform 14 by suitable fastening means 109.

The tubular membrane 16 fits over the supporting structure 101 as well as the wheels 107, so as to assume the same cross sectional configuration as in the first described structure. The bottom wall or web of the membrane is interposed between the wheels 107 and cups 108, as shown best in FIGURE 6. It has been found that when the membrane is pulled past the supporting structure 101, that the supporting structure will remain in place even though the membrane is being pulled between the wheels 107 and the cups 108; that is, no other restraint is required for the supporting structure.

As the membrane leaves the supporting structure 101, it tends to return to its flat condition. This is aided by a bar 110 located below and beyond the platform 14, and supported from the adjacent pair of legs 13 by a bracket 111. Also supported by the bracket 111 is a motor 112, having a pair of drive gears 113, underlying the folded edges 114 of the membrane 16, as shown best in FIGURES 5 and 10. The folded edges or margins of the membrane are caused to intermesh with the drive gears 113 by idler gears 115 disposed above the membrane and supported from brackets 116, which are pivotally connected to the adjacent legs 13 so that the idler gears may be moved clear of the membrane, as indicated by broken lines in FIGURE 5. The operation of the modified form of the supporting structure and the drive means is essentially the same as that of the first described structure.

Reference is now directed to FIGURES 7 and 8. In some instances, where the volume and weight of the refuse is relatively heavy and also if the supporting structure is relatively long so as to accommodate a large number of cages, the upper wall of the membrane may sag excessively and even form pockets between successive transverse rods 106. This condition is eliminated by an apron 117 extending between the side frames of the supporting structure and sloping downward from the end which receives the membrane 16 toward the end from which the membrane discharges. The apron has, preferably, a catenary cross section and is formed of sheet metal. The apron may be coated with a material having a low coefficient of friction such as Teflon. Also the apron may be formed of flexible sheet plastic material of heavier gauge than the membrane 16.

While it is preferred that the membrane 16 be in the form of a tube or sleeve, the membrane may be in the form of a single sheet of greater width than the supporting structure so that its side margins overlie the side frames of the supporting structure. In this case, the upper wall of the membrane is supported by the apron 117.

Reference is now directed to FIGURE 11 which illustrates a construction permitting reuse of the membrane 16, and is shown as incorporating the construction illustrated in FIGURES 1, 2 and 3. However, it is equally adaptable to the construction as shown in FIGURES 4, 5, 6, 9 and 10. In the construction shown in FIGURE 11, a roll shaft 118 is suitable supported between each pair of legs 13 and a drive means 46 is provided at each end in place of one end as shown in FIGURE 1. Scraper blades 119 contact the membrane so as to deflect the refuse onto chutes 120, which discharge the refuse in a container 52. Washing nozzles 121 are positioned to direct a spray of water or water and detergent against the membrane so as to remove residual refuse.

The modified structure shown in FIGURE 11 is operated by first moving the membrane in one direction by one drive means and then moving the membrane in the opposite direction by the other drive means.

Reference is now directed to FIGURE 12 in which a modified form of restraining means is illustrated. In this case a slitting knife 122 severs the lower wall or web 26 of the membrane 16, as it emerges from the supporting structure, so as to provide entrance to the space within the membrane. The slitting knife is attached to or forms a part of a supporting bracket 123 which is attached by a retainer clip 124 or other means to the supporting structure 101. In this case the wheels 107 and cups 108 may be omitted and mating pairs of cylindrical wheels substituted.

It should be noted that in each of the constructions illustrated, the supporting structure is substantially wider than the depth of the cages so that refuse which may be discharged forwardly or rearwardly from the cages will still fall on the membrane so as to eliminate the need of cleaning the bench 12 or the floor due to any accumulation of refuse or droppings.

It should also be noted that while a single row of cages is illustrated, that if the size of the animal permits, several rows of cages may be stacked and an apparatus for removing the droppings may be installed between each row without danger that the droppings from one row of cages will fall on or contaminate the row below.

While the several embodiments of the apparatus for receiving and removing droppings from caged animals herein shown and described in detail are fully capable of attaining the objects and providing the advantages hereinbefore mentioned, it is to be understood that it is merely illustrative of the presently preferred embodiments of the invention.

I claim:
1. A conveying apparatus comprising:
   (a) a table including a platform having a top wall;
   (b) a membrane-shaping means mounted on said top wall;
   (c) a roll membrane initially in the form of a roll rotatably mounted on said platform adjacent said membrane-shaping means, said membrane dimensioned to encompass said membrane-shaping means and form thereon a trough means;
   (d) drive means frictionally engaging said membrane for moving it past said membrane-shaping means;
   (e) and means for restraining said membrane-shaping means so that it will remain stationary on said top wall while said membrane is moved linearly with respect to said membrane-shaping means, whereby said membrane may be supplied from said roll in flat form, shaped into said trough means by said membrane-shaping means and disposed of after passing by said membrane-shaping means.

2. An apparatus, as defined in claim 1, wherein:
   (a) the means for restraining the membrane-shaping means includes at least one caging roller mounted on the bottom of the membrane-shaping means;
   (b) and at least one roller is mounted on the platform so that at least a portion of it projects above the top wall of the platform, and said caging roller is positioned so as to press against said last mentioned roller mounted on the platform so that the membrane-shaping means will remain stationary when traveling membrane material is moved past it.

3. In combination, cage means and traveling membrane means, comprising:
   (a) a table including a platform having a top wall;
   (b) a cage-supporting frame mounted on said table superjacent said top wall of said platform;
   (c) a plurality of cages mounted on said cage-supporting frame, each of said cages including a wire-mesh bottom wall through which refuse may pass;
   (d) membrane-shaping means mounted on said platform below said wire-mesh bottom walls in juxtaposition therewith;
   (e) a disposable traveling membrane encompassing said membrane-shaping means to be formed into trough means thereby;
   (f) drive means frictionally engaging said material for moving it past said wire-mesh bottom walls to collect said refuse in said trough means;
   (g) means for caging said membrane-shaping means so that it will remain stationary on said platform while said membrane is moved linearly with respect to said membrane-shaping means, whereby said membrane may be supplied from a roll in flat form, shaped into said trough means by said membrane-shaping means and disposed of after passing by said membrane-shaping means.

4. A conveying apparatus and a disposable traveling membrane means therefor comprising:
   (a) a table including a platform having a top wall;
   (b) a membrane-shaping means mounted on said top wall;
   (c) a roll of a disposible traveling membrane rotatably mounted on said platform adjacent said membrane-shaping means, said membrane including side walls overlying the opposite sides of said membrane shaping means and the portion of said membrane between said side walls forming a trough means;
   (d) drive means frictionally engaging said membrane for moving it past said membrane-shaping means;
   (e) means for restraining said membrane-shaping means so that it will remain stationary on said top wall while said membrane is moved linearly with respect to said membrane-shaping means, whereby said membrane may be supplied from said roll in flat form, shaped into said trough means and disposed of after passing by said membrane-shaping means.

5. An apparatus, as defined in claim 4, wherein:

(a) the means for restraining the membrane-shaping means includes at least one caging roller mounted on the bottom of the membrane-shaping means;

(b) and at least one roller mounted on the platform so that at least a portion of it projects above the top wall of the platform, and said caging roller is positioned so as to press against said last mentioned roller mounted on the platform so that the membrane-shaping means will remain stationary when traveling membrane is moved past it.

6. In combination, cage means and traveling membrane means comprising:

(a) a table including a platform having a top wall;

(b) a cake-supporting frame mounted on said table superjacent said top wall of said platform;

(c) a plurality of cakes mounted on said cage-supporting frame, each of said cakes including a wire-mesh bottom wall through which refuse may pass;

(d) membrane-shaping means mounted on said platform below said wire-mesh bottom walls in juxtaposition therewith;

(e) a disposable traveling tubular membrane encircling said membrane-shaping means, the upper side collect said refuse in said trough means;

(f) drive means frictionally engaging said membrane for moving it past said wire-mesh bottom walls to collect said refuse in said through means;

(g) means for restraining said membrane-shaping means so that it will remain stationary on said platform while said membrane is moved linearly with respect to said membrane-shaping means, said restraining means including at least one caging roller mounted on the bottom of the membrane-shaping means, at least one roller mounted on the platform so that at least a portion of it projects above the top wall of the platform, and said caging roller is positioned so as to press against said last mentioned roller so that the membrane-shaping means is held stationary as said membrane is moved past it, whereby said membrane may be supplied from a roll in the form of a flat tube shaped into a sleeve forming trough means by said membrane-shaping means and disposed of after by said membrane-shaping means.

7. An apparatus for receiving and removing animal droppings from a row of cages having perforated bottoms, said apparatus comprising:

(a) a frame having parallel side members disposed under said row of cages;

(b) means for maintaining said frame in a fixed position;

(c) a flexible membrane having a greater width than said frame and including side margins covering the side members of said frame, and a central portion capable of assuming an essentially cantenary cross section draped between said side members, said membrane being initially wrapped to form a roll;

(d) means for supporting said roll at one end of said frame;

(e) a web extending under said frame between said margins and completing said membrane to form a sleeve, said web restraining the central portion of said membrane to said cantenary cross section;

(f) and means for advancing said membrane along said frame and under said row of cages.

8. An apparatus, as defined in claim 7, wherein:

(a) additional restraining means includes a fixed apron interposed between the side members of said frame.

9. An apparatus, as defined in claim 7, wherein said frame position maintaining means includes:

(a) a pair of laterally spaced lower external wheels disposed under said membrane web and projecting into the boundaries of said frame;

(b) a pair of internal wheels for each outer wheel disposed within the sleeve formed by said membrane whereby the membrane arches over said outer wheels;

(c) and upper external wheels restrain said frame from rising on said lower external wheels.

10. An apparatus, as defined in claim 7, wherein said frame position maintaining means includes:

(a) a set of external socket members disposed under said frame and the web portion of said membrane;

(b) and a set of internal freely rotatable rollers disposed within the sleeve formed by said membrane and connected to said frame;

(c) said rollers pressing said membrane into said socket members.

11. An apparatus, as defined in claim 7, wherein said frame position maintaining means includes:

(a) a knife disposed at the end of frame from which said membrane discharges for severing the web portion of said membrane;

(b) and a fixed bracket supports said knife and extends through said membrane for attachment to said frame.

12. A self-cleaning animal cage comprising:

(a) cage means for housing an animal, said cage means including openings through which droppings from said animal may pass;

(b) traveling web means including a roll of traveling web material having an encompassing side wall and forming a trough mounted below said cage means for collecting said droppings and moving them and the traveling web material to a discharge point for disposal;

(c) and a web-shaping frame, said frame being encompassed by said material for forming a trough means in said side wall, said droppings being collected in said trough means.

13. An apparatus for receiving and removing animal droppings from a row of cages having perforated bottoms, said apparatus comprising:

(a) a frame having parallel side members disposed under said row of cages;

(b) means for maintaining said frame in a fixed position;

(c) a flexible membrane having a greater width than said frame and including side margins covering the side members of said frame, and a central portion capable of assuming an essentially cantenary cross section draped between said side members, said membrane being initially wrapped to form a roll;

(d) means for supporting said roll at one end of said frame;

(e) means restraining the central portion of said membrane to said cantenary cross section;

(f) means for advancing said membrane along said frame and under said row of cages;

(g) a supporting means for a roll of said membrane at both end of said frame;

(h) means at each end of said frame for removing the droppings from said membrane;

(i) and an advancing means at each end of said frame which includes means for wrapping said membrane into a roll, whereby said membrane may be advanced first in one direction and then in the opposite direction.

References Cited

UNITED STATES PATENTS 2,186,120   1/1940   Oser _____ 119—22 X
2,565,521   8/1951   Ratermann _____ 119—22

HUGH R. CHAMBLEE, Primary Examiner